June 2, 1936.
LOUIS-EUGÉNE-WIDOLT MONTROSE-OSTER
2,042,623
PIVOTED WHEEL FOR VEHICLES
Original Filed May 6, 1931   3 Sheets—Sheet 1
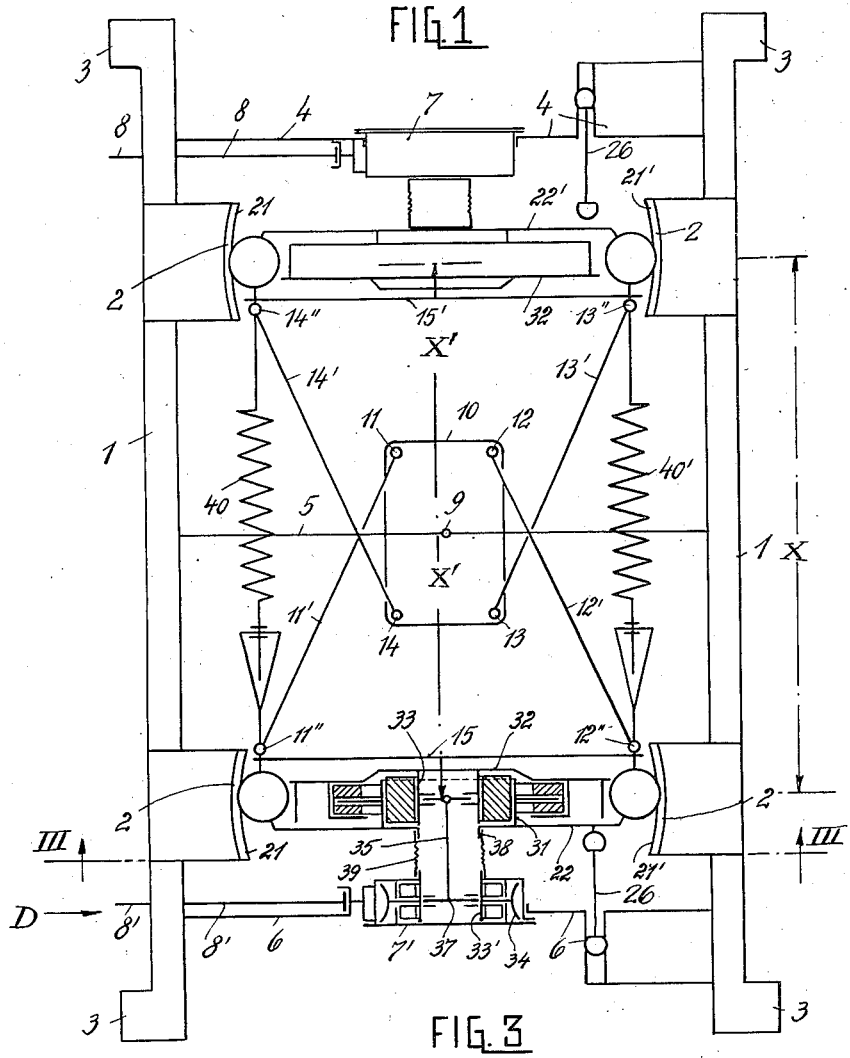
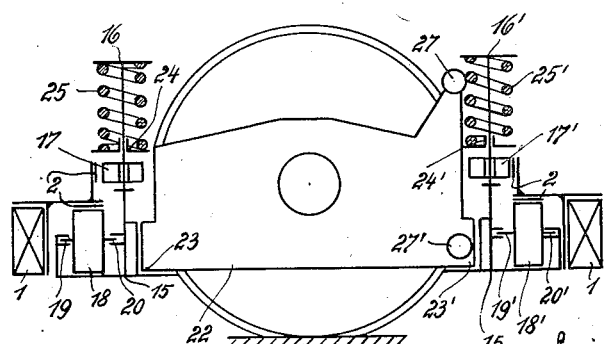
Inventor:
Louis-Eugéne-Widolt Montrose-Oster
By Richards & Geier
Attorneys June 2, 1936.
LOUIS-EUGÉNE-WIDOLT MONTROSE-OSTER
2,042,623
PIVOTED WHEEL FOR VEHICLES
Original Filed May 6, 1931    3 Sheets—Sheet 2
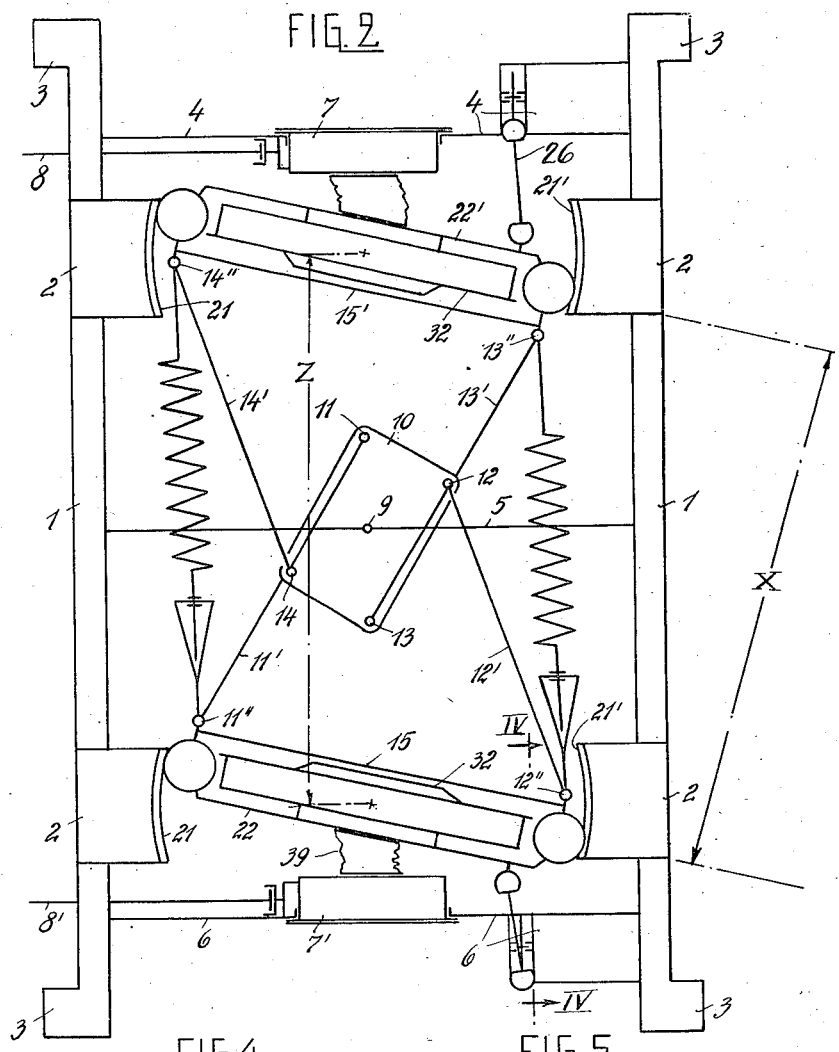
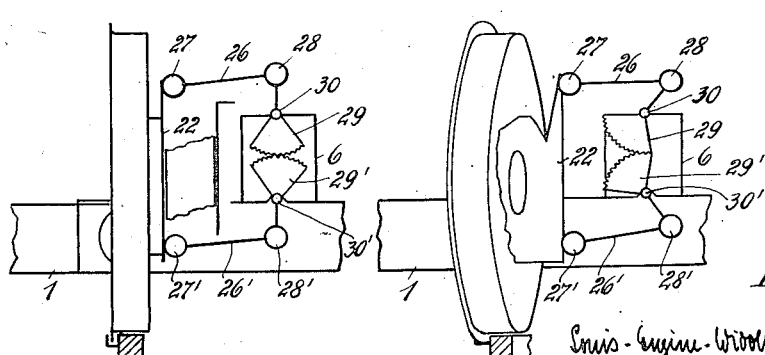
Inventor:
Louis-Eugene-Widolt Montrose-Oster
By Richards & Geier
Attorneys

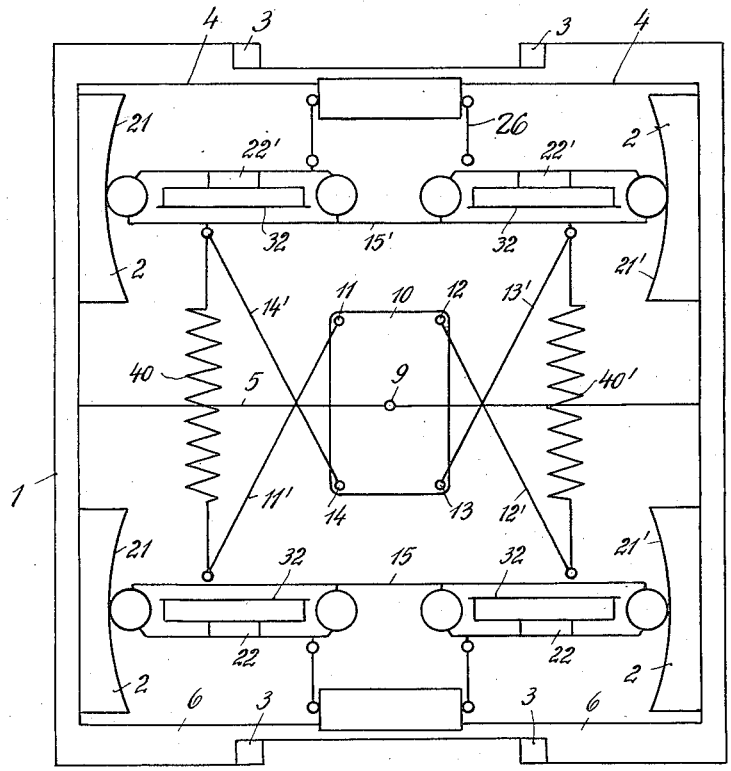

Patented June 2, 1936

2,042,623

UNITED STATES PATENT OFFICE 2,042,623

PIVOTED WHEEL FOR VEHICLES

Louis-Eugène-Widolt Montrose-Oster, Carlsbad, Czechoslovakia

Original application May 6, 1931, Serial No. 535,532. Divided and this application June 17, 1933, Serial No. 676,250. In Germany January 10, 1931

12 Claims. (Cl. 105—169)

The subject matter of this application constitutes a division of the pending application Serial No. 535,532, filed May 6, 1931.

My invention relates to pivoted wheels for vehicles, and more especially to pivoted wheels for vehicles which travel on rails. An object of this invention is a novel construction of wheels permitting to keep constant the effective distance between the two tread circles of the wheels, that is the running gauge of the tires in one and the same half-truck, said distance or gauge being equal to the track gauge, while the actual distance between the center points of the planes of rotation of the wheels is increasing as a function of the displacement or swing of the wheels.

In my present invention wheels without axles, that is wheels without through axles are used in order to reduce the unsprung weight. Trucks which are equipped with wheels constructed in this manner are especially suitable for street cars with a low floor passing throughout the car. The connection of the two free wheels or two groups of free wheels of one and the same truck is effected in this construction by means of a control member in the form of a crank-disk.

The above and other objects of this invention may be realized by a construction which will be described hereinafter, reference being had to the accompanying drawings which form part of this specification.

In the drawings:

Figure 1 shows diagrammatically in top view and partly in section a half truck having a crank disc cooperating with worms and Cardan shafts for steering one pair of wheels, said half-truck being situated in normal straight position, so that the distance $x'$ between the pivoting points of the wheels is equal to the running gauge $x$.

Fig. 2 is a top view of the same half-truck upon a curve, the distance $z$ between the pivoting points of the wheels having become greater than the running gauge $x$.

Fig. 3 is a section along the line III—III of Fig. 1, looking in the direction of the arrows.

Fig. 4 is a section along the line IV—IV of Fig. 2, looking in the direction of the arrows.

Fig. 5 is a view similar to that of Fig. 4, showing the wheel in a different position.

Fig. 6 shows an equivalent arrangement of a truck and wheel system with a crank disk as guide member in connection with a modified construction in which every truck comprises two pairs of wheels arranged in tandem, instead of two individual oppositely positioned wheels.

Since the degree of pivoting of tandem wheels keeps within relatively narrow limits, each pair of tandem wheels may be placed below seats of the car permitting to also equip cars having some greater length—which otherwise could only be constructed as cars with four axles and a relatively high floor—with the novel construction which therefore may be designated as a truck of the cut open type or half-truck.

In the present case the frame proper of the half-truck consists of two rods or beams 1 positioned transversely to the car, said rods or beams being equipped with horizontal as well as vertical races 2 and with ends 3 supporting leaf-springs (not shown for the sake of simplicity), the body of the car thus resting upon said leaf-springs. The two rods or beams 1 are rigidly connected with each other by means of the transoms 4, 5 and 6 shown in the upper, middle and under part of Fig. 1. Rigidly connected to the outer transoms 4 and 6 are worm gear casings 7 and 7'. Cardan shafts 8 and 8' lead from the worms of said worm gear casings towards the driving motors which are mounted in known manner on the body of the car. The leaf-springs (not shown) which rest on the ends 3 of the rods will therefore permit the half-truck and therewith the worm, the worm gear, as well as the worm gear casing to move only in a vertical sense with respect to the driving motors in accordance with the degree of resiliency of the springs. On the middle transom 5 there is provided a crank disk 10 rotatable around the center-point 9 which is positioned in the central axis of the half-truck. The crank disk 10 is connected at four points 11, 12, 13 and 14 thereof with the one ends of four symmetrically arranged guide rods 11', 12', 13' and 14', respectively, said guide rods being connected at their other ends with bridges 15 and 15'; for instance, two of said rods 11' and 12' are connected with the points 11'' and 12'' of the bridge 15 which extends around the wheel and carries two vertical extensions in the form of rods 16 and 16' provided with spring sockets. The rods 16 and 16' are equipped with rollers 17 and 17', respectively, which are around said rods at the height of the central axis of the wheel. The bridge 15 furthermore is provided within the plane of the wheel with two further rollers 18 and 18' having an horizontal axis of rotation, the journals of said rollers being mounted at 19 and 20 and 19' and 20'. The rollers 18 and 18' serve to support the weight of the truck and of the entire body of the car and revolve upon the under surface of the horizontal roller races 2. The rollers 17 and 17' are in contact with the vertical roller races 2 and their ends 21 and 21' serve as catches or stops.

Similar to the catches used in connection with axle casings of ordinary construction the bridge engages with the plate 22 which is mounted slidingly in vertical direction on said bridge and with extensions or catches 23, 23'. This plate 22 is provided with perforated extensions 24 and 24' through which the rods 16 and 16' pass for pressing the springs 25 and 25' against the spring sockets on said rods. 26 and 26' are guide rods having spherical ends engaging at the points 27 and 27' with the plate 22 as well as at the points 28 and 28' with the toothed segments 29 and 29' mounted on the transverse rod 6, when they may pivot around the points 30 and 30', vertically positioned above each other. Instead of this arrangement parallel guiding of the wheels may evidently also be effected by means of three guide rods of which two are positioned in a vertical plane.

The plate 22 is equipped with a cylindrical projection 31 carrying bearings similar to the front wheel bearings of automobiles, supporting the wheel 32, thus forming a casing. The wheel 32 itself is provided with a cylindrical recess 33 positioned within the plane of rotation of said wheel. A like cylindrical central recess 33' is provided on the usually employed oppositely positioned worm gear 34. Connection between said cylindrical recess 33 on the wheel 32 and the cylinder 33' of the worm gear 34 is effected by a Cardan or universal joint of ordinary construction permitting the following motions of said wheel with respect to the worm gear: Firstly, to move in vertical direction, secondly, to approach said worm gear with its center 36, and thirdly, to swing around an axis perpendicular to the plane of the drawings, this axis being likewise perpendicular to the common central axis of the truck and of the free wheels and moving along said central common axis in direction towards the worm gear casing.

Intermediate the worm gear 7' and the cylindrical part 38 of the plate 22 there is interposed a leather cuff 39 as a protection for the Cardan drive against entrance of dust and dirt.

Retracting springs 40 and 40' may be provided intermediate the points 11'' and 14'' on the one hand and the points 12'' and 13'' on the other hand, said retracting springs being of shortest length as shown in Fig. 1 and expanded according to Fig. 2. Instead of that it is possible to insert a suitable damping device at this place.

When a car provided with the described half-trucks begins to move along a right-hand curve in a direction of the arrow D (Fig. 2), the various parts of the device will assume the position shown in Figure 2.

The inner surface of the flange of the upper left wheel will run along the rail which bends toward the right, as well as the lower right wheel, the outer surface of which will run along the side wall of the groove of the rail, provided that the rail is a grooved one. The front portions of the two wheels are thereby moved toward the right, in the direction of the arrow D. If an ordinary rail is used, it is sufficient that the left wheel run along the rail, since the position of the other wheel is adjusted correspondingly by the crank disc and the four guide rods.

Therefore, when the upper left wheel is turned toward the right, the crank disc 10 is moved automatically, since it is connected with the wheel by the guide rods 14' and 13'. The point 13 is thereby moved away to a slight extent from the central axis of the half-truck, which coincides with the longitudinal direction of the car, while the point 14 approaches the central axis. The point 13 moves away to a distance which is smaller than that by which the point 14 approached the central axis, so that the pivoting point of the wheel moves further away from the central axis.

Obviously, the four points 11, 12, 13 and 14 upon the crank disc 10 must be so selected, that the distance of the pivoting points of the wheels from said central axis increases to such an extent, that the perpendicular distance $x$ between the planes of the wheels remains constant and equal to the running gauge.

As soon as the car has left the right-hand curve, the springs pull the bridges and the wheels back in their normal position; or, the flange of the lower right wheel begins to run along a straight rail and is thus brought into the position shown in Fig. 1 without the assistance of the springs, moving the upper left wheel along with it, said upper left wheel being connected with the lower right wheel by the crank disc and the guide rods.

The wheels are maintained in their straight positions, i. e. at right angles to the plane of the frame, by separate stabilizing mechanisms which are shown more clearly in Figs. 4 and 5. Each mechanism maintains its wheel practically at right angles to the frame, and yet permits it to shift vertically against the action of the springs and to swing around an axis which is formed by a line connecting the spherical guides 27 and 27', as well as to move in a horizontal direction, i. e., in the plane of the frame.

Due to the particular form of the curved guides or races 2, this horizontal movement takes place in such manner that when the wheels are turned, the central or the pivoting point of the wheels is upon the central axis of the half-trucks which forms an angle of 90° with the direction of travel. When a car provided with the described half-trucks begins to move along a right-hand curve in the direction of the arrow D (Fig. 2), the various parts of the device will assume the position shown in Figure 2.

In Fig. 6 which shows a construction of a truck having two wheels arranged in tandem with respect to either rail the bridges 15 and 15' are properly extended to reach around two wheels of the tandem arrangement. Accordingly, these bridges will have four points of support. The points at which the bridges engage with the connecting rods of the crank disk remain unchanged as compared with a bridge reaching around only one wheel. Moreover, Fig. 6 shows that in principle the arrangement remains fully unchanged, irrespective of the fact whether the truck comprises two or four wheels. For the sake of not unnecessarily complicating the drawings the proper gearing system is omitted from Fig. 6. The truck shown in Fig. 6 comprises two pairs of wheels 32, each pair of wheels being mounted in a tandem arrangement and being surrounded by a separate bridge 15 or 15'. The frame of the truck comprises beams 1 carrying vertical races 2 and connected with each other by transoms 4, 5 and 6. The wheels 32 are mounted in casings or plates 22 and 22' which are also surrounded by the bridges 15 and 15', respectively. The distancing mechanism interposed between the frame of the truck and the bridges 15 and 15' comprises a crank disc 9 pivotally mounted upon the transom 5, and guide rods 11', 12', 13' and 14' which are connected with the crank disc 9 are so selected that a constant perpendicular distance between the vertical planes of the wheels is maintained, so that the distancing mechanism keeps constant the running gauge between the two tandem arrangements. The truck is also provided with two retracting springs 40 and 40' interconnecting the two tandem arrangements.

As regards the last-mentioned connecting rods, I desire of being understood that also three or more connecting rods may be used in conjunction with the crank disk and that said connecting rods, in addition, may also be arranged crosswise with respect to each other. The guide mechanism proper may also consist of a plurality of crank disks or similar elements.

Although in the foregoing specification I have preferred to describe my novel truck and pivoted wheel construction in connection with cars or other vehicles which travel on rails, it will be evident from the herein given explanation that my novel construction may also advantageously be used in connection with street cars for passenger service or in connection with freight cars or wagons, trolley busses, automobiles, auto-busses and similar vehicles, in fact, in all devices in which it is necessary or desirable to keep constant the running gauge, i. e. the perpendicular distance of the wheel planes from each other. In every particular case the truck and wheel construction may be modified to meet special requirements.

The directions and explanations given hereinabove will enable anyone skilled in the art to construct my present truck and pivoted wheels.

In general it is preferable when constructing the truck and wheels to entirely dispense with through axles as well as with ordinary wheel journals in particular. By this the valuable advantage will be attained that cars or vehicles equipped with my present pivoted wheels may be constructed with a floor which extends in horizontal direction throughout the length of the car or vehicle at the height of a single step above the surface of the street, at the same time permitting to reduce the unsprung weight of the car to a minimum. An essential technical progress will therefore immediately result in every case, when employing my new construction. My present invention, however, may also be used with advantage in connection with cars or vehicles of the ordinary construction in which through axles are employed. In this case my invention may be used in connection with cars or vehicles having telescopic axles, that is axles which may be lengthened and shortened in accordance with demand by inserting one part of the axle into the other or by drawing one part out of the other in the manner of a telescope. Furthermore the advantages of my truck and wheel construction will likewise be present, if the adjustment of the wheels is effected by hand, by the aid of a servomotor or similar adjusting means.

Finally I desire of being understood that single elements or combination of several elements which form part of the construction according to my present invention, such as for instance the mechanism for parallelly guiding the wheels or the guide rods, represent novel and advantageous individual constructions. I, therefore, aim in the appended claims to cover all those elements or combinations of elements of my present construction, which I believe are new and useful and which result in novel advantages not present in known constructions.

I claim:

1. In a truck for vehicles, a frame, a pair of casings, a pair of bridges, each bridge extending around a separate casing, each casing containing the journals of a wheel; and a distancing mechanism interposed between said frame and said bridges, said distancing mechanism comprising a movable member carried by said frame and a plurality of guide rods connected with said member and said bridges, the connecting points of said member being so selected as to always keep constant the running gauge of two wheels, the distance of the virtual pivoting points of the wheels being increased in function of the pivoting of said wheels.

2. In a truck for vehicles, a frame, a plurality of bridges, a plurality of casings, a plurality of wheels, each wheel being journalled in a separate casing, a distancing mechanism interposed between said frame and said bridges, and means for maintaining the vertical planes of said wheels at a right angle to the horizontal plane of said frame, said means comprising a plurality of inter connected ball joints, guide rods and toothed segments cooperating with said wheels, said wheels being movable along with their casings in a vertical and horizontal direction with respect to said frame.

3. In a vehicle, a car body, a frame, a pair of casings, a pair of wheels, each wheel being journalled in a separate casing, guide rods fulcrumed to said casings and to said frame, gear casings mounted in said frame, and springs interposed between said car body and said frame, said springs absorbing the torques arising in the gear casings during starting and braking of the vehicle.

4. A truck for vehicles, comprising in combination, a bridge, bearings connected with said bridge, a pair of wheels mounted in said bearings, a guide mechanism comprising a crank disc mounted separately from said wheels and pivoting in said truck, and at least two connecting rods operatively interposed between said bridge and said crank disc and distancing said wheels in accordance with the track gauge, the connecting points of said rods with said crank disc being so selected that a constant perpendicular distance between the vertical planes of the wheels is maintained.

5. A truck for vehicles in accordance with claim 4, wherein said crank disc is mounted at the point of intersection of the axes of the wheels and of the longitudinal axis of the vehicle, and said connecting rods are situated crosswise from said crank disc to said frame.

6. A truck for vehicles, comprising a frame, a pair of bridges in said frame, a pair of wheel-casings, a pair of wheels, each wheel being journalled in a separate wheel-casing, each bridge extending around a wheel-casing and a wheel, a distancing mechanism interposed between said frame and said wheel-casings, said distancing mechanism comprising a crank disc mounted and pivoting in said frame, and at least two connecting rods operatively interposed between each of said wheel-casings and said crank disc and distancing said wheels in accordance with the track gauge, the connecting points of said rods with said crank disk being so selected that a constant perpendicular distance between the vertical planes of the wheels is maintained.

7. A truck for vehicles in accordance with claim 6, wherein said crank disc is mounted at the point of intersection of the axes of the wheels and of the longitudinal axis of the vehicle, and wherein said connecting rods extend crosswise from said crank disc to said wheel casings.

8. A truck for vehicles, comprising a frame, a central crank disc mounted in said frame, casings, wheels carried by said casings, connecting rods operatively connecting said crank disc and said casings, a plurality of bridges, each bridge extending around a separate casing, and a plurality of coil springs, each coil spring being interposed between a separate bridge and its wheel.

9. A truck for vehicles, comprising in combination, a frame, a plurality of casings, wheels mounted in said casings, a plurality of bridges, each bridge extending around a separate casing, a central crank disc, connecting rods fulcrumed to said crank disc and said casings, said crank disc and said rods being adapted to increase the distance between the actual pivoting points of said wheels in dependence from the angle of swing of said wheels and to maintain the effective running gauge of said wheels by increasing said distance whilst keeping constant the vertical distance between the planes of the wheels, said bridges including rollers mounted at the height of the axis of said wheels to rotate around vertical axes, said rollers being adapted to permit the swinging motion of said bridges, said casings and said wheels, and roller races associated with said rollers and permitting a rotation of said rollers during the swinging of said bridges, casings and wheels.

10. A truck for vehicles, comprising a frame, a plurality of casings, wheels mounted in said casings, a central crank disc, distancing rods connecting said disc with said casings, the connecting points of said distancing rods with said crank disc being so selected that a constant perpendicular distance between the vertical planes of the wheels is maintained, and a stabilizing mechanism for each wheel, said mechanism including two guide rods having the form of ball-joints, two vertically positioned toothed segments, said guide rods being arranged one vertically above the other and connected on one side to said casings, on the other to said segments, and bearings for said toothed segments, said bearings being rigidly connected with said frame; two pairs of roller races for each wheel, the combination of said distancing rods, said stabilizing mechanism and said roller races permitting the wheels to pivot around an axis vertical to the frame, to yield in vertical direction and to yield in transversal direction if pivoting.

11. A truck for vehicles, comprising in combination with a motor, coil springs and leaf springs, a frame, wheels having hollow axles, casings, said wheels being journalled with said axles in said casings, and gear casings mounted on said frame, each gear casing being provided with two Cardan shafts, one of said Cardan shafts being interposed between the wheel and a gear casing, the other Cardan shaft being interposed between the gear casing and the motor, the first-mentioned Cardan shaft permitting the pivoting of the wheels and the action of the coil springs, the second-mentioned Cardan shaft permitting the action of the leaf-springs.

12. A truck for vehicles comprising, a frame, two bridges, two pairs of wheels, each pair of wheels being mounted in tandem arrangement, each bridge extending around a separate pair of wheels, and a distancing mechanism interposed between said frame and said bridges, said distancing mechanism including a crank disc and a plurality of guide rods connected with said crank disc and said bridges, the connecting points of said guide rods with said crank disc being so selected that a constant perpendicular distance between the vertical planes of the wheels is maintained, said distancing mechanism being thereby adapted to keep constant the running gauge between the two tandem arrangements, and two coil springs interposed between each tandem wheel and said bridge.

LOUIS-EUGÈNE-WIDOLT  
MONTROSE-OSTER.